(12) United States Patent
Singhal et al.

(10) Patent No.: US 10,510,007 B2
(45) Date of Patent: Dec. 17, 2019

(54) SYSTEMS AND METHODS FOR GENERATING PERFORMANCE PREDICTION MODEL AND ESTIMATING EXECUTION TIME FOR APPLICATIONS

(71) Applicant: Tata Consultancy Services Limited, Mumbai (IN)

(72) Inventors: Rekha Singhal, Mumbai (IN); Amit Sangroya, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 786 days.

(21) Appl. No.: 15/070,979

(22) Filed: Mar. 15, 2016

(65) Prior Publication Data

US 2017/0169336 A1 Jun. 15, 2017

(30) Foreign Application Priority Data

Dec. 15, 2015 (IN) .......................... 4708/MUM/2015

(51) Int. Cl.
  *G06N 5/02* (2006.01)
  *G06F 16/901* (2019.01)
  (Continued)

(52) U.S. Cl.
  CPC ......... *G06N 5/022* (2013.01); *G06F 11/3428* (2013.01); *G06F 11/3447* (2013.01); *G06F 16/9024* (2019.01); *G06F 16/90335* (2019.01)

(58) Field of Classification Search
  CPC . G06N 5/022; G06F 11/3419; G06F 11/3428; G06F 11/3447; G06F 11/3466; G06F 17/30958; G06F 17/30979
  (Continued)

(56) References Cited

U.S. PATENT DOCUMENTS 9,262,216 B2 * 2/2016 Bodik ................... G06F 9/4887
2013/0104140 A1 4/2013 Meng et al.
(Continued)

FOREIGN PATENT DOCUMENTS

CN 104298771 1/2015

OTHER PUBLICATIONS

Zhang et al., "Benchmarking Approach for Designing a MapReduce Performance Model" Apr. 21-24, 2013, ICPE'13, pp. 253-258. (Year: 2013).*

(Continued)

*Primary Examiner* — Vincent Gonzales
*Assistant Examiner* — Chase P. Hinckley
(74) *Attorney, Agent, or Firm* — Finnegan, Henderson, Farabow, Garrett & Dunner LLP

(57) ABSTRACT

Systems and methods for generating performance prediction model and estimating execution time for applications is provided. The system executes synthetic benchmarks for a first dataset on a first cluster. Each synthetic benchmark includes a MapReduce (MR) job. The system further extracts sensitive parameters for each sub-phase of the MR job, generates a linear regression prediction model for each sub-phase to obtain one or more linear regression prediction models, based on which the system further generates a performance prediction model to be utilized for predicting, using the sensitive parameters, a Hive query execution time of a Directed Acyclic Graph (DAG) of one or more MR jobs executed on a second dataset on a second cluster, wherein the first cluster that includes the first dataset is smaller compared to the second cluster that includes the second dataset.

17 Claims, 8 Drawing Sheets

(51) Int. Cl.
*G06F 16/903* (2019.01)
*G06F 11/34* (2006.01)

(58) Field of Classification Search
USPC .............................. 706/46; 707/736; 718/100
See application file for complete search history.

(56) References Cited

U.S. PATENT DOCUMENTS

| | | | | |
|---|---|---|---|---|
| 2013/0254196 | A1* | 9/2013 | Babu | G06F 11/3404 707/736 |
| 2013/0339972 | A1* | 12/2013 | Zhang | G06F 9/5066 718/104 |
| 2014/0215471 | A1* | 7/2014 | Cherkasova | G06F 11/3428 718/102 |
| 2014/0215487 | A1* | 7/2014 | Cherkasova | G06F 9/5083 718/106 |
| 2014/0359624 | A1 | 12/2014 | Cherkasova et al. | |
| 2015/0012629 | A1* | 1/2015 | Verma | G06F 11/3428 709/223 |
| 2016/0098342 | A1* | 4/2016 | Faizanullah | H04L 67/34 717/131 |
| 2017/0039239 | A1* | 2/2017 | Saadat-Panah | G06F 17/30463 |
| 2017/0123855 | A1* | 5/2017 | Li | G06F 9/5055 |
| 2019/0065336 | A1* | 2/2019 | Singhal | G06F 9/5061 |

OTHER PUBLICATIONS

Saletore et al., "HcBench: Methodology, Development, and Characterization of a Customer Usage Representative Big Data/Hadoop Benchmark" Sep. 22-24, 2013, IEEE International Symposium on Workload Characterization, pp. 77-86. (Year: 2013).*

Bardhan, S. et al., "Queuing Network Models to Predict the Completion Time of the Map Phase of MapReduce Jobs", International computer measurement group conference Las Vegas, International Computer Measurement Group Conf., 9 pages, (2012).

* cited by examiner

| MR Phase | Size of Input Data (Map/Reduce) | Size of Output Data (Map/Reduce) | Map Tasks | Number of Input Records (Map/Reduce) | Number of Output Records (Map/Reduce) | Reduce Tasks |
|---|---|---|---|---|---|---|
| Read | ✓ | | ✓ | ✓ | | |
| Collect | | | ✓ | | ✓ | |
| Spill | | ✓ | ✓ | | ✓ | |
| Merge | | ✓ | ✓ | | ✓ | |
| Shuffle | | ✓ | | | | ✓ |
| Sort | | ✓ | | | | ✓ |
| Write | | ✓ | | | ✓ | |

FIG. 4

SYSTEMS AND METHODS FOR GENERATING PERFORMANCE PREDICTION MODEL AND ESTIMATING EXECUTION TIME FOR APPLICATIONS

PRIORITY CLAIM

This U.S. patent application claims priority under 35 U.S.C. § 119 to: India Application No. 4708/MUM/2015, filed on Dec. 15, 2015. The entire contents of the aforementioned application are incorporated herein by reference.

TECHNICAL FIELD

This disclosure relates generally to data processing techniques, and more particularly to systems and methods for generating performance prediction model and predicting execution time for datasets.

BACKGROUND

With the exponential data growth, more and more companies are relying on MapReduce frameworks such as Hadoop for their data processing needs. Estimating the performance of MapReduce jobs in advance can lead to various benefits such as designing better scheduling policies; Tuning Hadoop Parameters; Optimize the performance of MapReduce applications. MapReduce is a programming model and a software framework introduced by Google in 2004 to support distributed computing and large data processing on clusters of commodity machines. Predicting the performance of MapReduce applications is a challenging research problem because it involves the prediction of individual MapReduce jobs and jobs are composed of various sub phases. There are several parameters to tune, which can impact MapReduce job performance. Moreover, data skewness and distributed system networking issues make the prediction more difficult.

There are various state of the art techniques for performance prediction and resource scheduling of MapReduce applications. They use various approaches such as modeling, benchmarking and statistical approaches for analyzing the performance of MapReduce applications. For example, Starfish applies dynamic Java instrumentation to collect a runtime monitoring information about job execution at a fine grain level. Such type of detailed job profiling enables the authors to predict job execution under different Hadoop configuration parameters, automatically derive an optimized cluster configuration. However, there is also some overhead to do the detailed profiling.

Tarazu incorporates application and cluster characteristics using online measurement and performs predictive load balancing of Reduce computations. However, this model is specifically designed to consider the heterogeneity of the clusters and provide optimal performance in such clusters, and thus does not resolve the long need of predicting accurate job execution in an efficient manner.

Another tool proposes a benchmarking approach that derives a performance model of Hadoop's generic execution phases (once) for predicting the performance of different applications. Based on experiment conducted using the above tool. It is observed that the execution of each map (reduce) tasks consists of specific, well-defined data processing phases. Only map and reduce functions are custom and their executions are user-defined for different MapReduce jobs. The executions of the remaining phases are generic and depend on the amount of data processed by the phase and the performance of underlying Hadoop cluster. They do two separate level of profiling to measure the generic phases and map/reduce functions respectively. To measure generic phases they design a set of parameterizable synthetic micro benchmarks. To characterize execution times of generic phases, they run micro benchmarks on a Hadoop cluster by varying various parameters of MR jobs. Such job profiles capture the inherent application properties that are used to compute a lower bound and upper bound on response time by applying the analytical model. Primarily, the execution time of various phases depends on the data processed.

It is also observed that on same input data the processing time of Map/Reduce changes according to the increase in concurrent map tasks per node. This is because of the resource (disk) bottleneck at I/O level, when multiple map tasks are waiting to access the data from shared disk and there is a contention at the disk level for I/O as shown in FIG. 1. For example, when a read phase is considered, disk contention increases with increase in number of map waves which is proportional to both data size in read phase as well as total number of maps on the disk. FIG. 2 is a graphical representation that illustrates impact of increasing the concurrent map tasks per node on the processing time of read phase. As can be seen from FIGS. 1 through 2, existing tools and solutions only consider the data processed in each phase as the only parameter to build a model and implement such models. Moreover, larger data size leads to more map tasks and hence more workload for underlying local disk which increases execution time of a map task due to increased disk contention. In other words, such models are difficult to implement on applications that have high diversity in input data, and may yield in poor predicting performance and execution of applications which may have direct impact on resource utilization that result in system overhead.

SUMMARY

Embodiments of the present disclosure present technological improvements as solutions to one or more of the above-mentioned technical problems recognized by the inventors in conventional systems. For example, in one embodiment, a processor-implemented method is provided. The method includes executing, via one or more hardware processors, one or more synthetic benchmarks on a first dataset on a first cluster comprising a first set of nodes, wherein each of the one or more synthetic benchmarks comprises a MapReduce (MR) job, the MR job comprises a map task and a reduce task; extracting, via the one or more hardware processors, one or more sensitive parameters related to performance of each sub-phase in the MR job, wherein the one or more sensitive parameters comprises at least one of an input size per map task, map selectivity, number of map tasks, number of reduce tasks, record selectivity, concurrent map tasks per node, one or more map waves, and disk resource contention delay; generating, via the one or more hardware processors, a linear regression prediction model using the one or more sensitive parameters to obtain a set of linear regression prediction models; and generating, via the one or more hardware processors, a performance prediction model based on the set of linear regression prediction models generated using the first dataset.

In an embodiment, the processor-implemented method may further include processing, via the one or more hardware processors, a Hive query such that the Hive query is translated into Directed Acyclic Graph (DAG) of one or more MR jobs; executing, via the one or more hardware processors, the one or more MR jobs on a second dataset on a second cluster comprising a second set of nodes; extracting, via the one or more hardware processors, the one or more sensitive parameters from a job execution log obtained upon executing the DAG of the one or more MR jobs; and predicting, using the performance prediction model, a Hive query execution time of the DAG of the one or more MR jobs based on the one or more sensitive parameters from logs obtained for one or more sub-phases of the one or more MR jobs executed on the second dataset.

The Hive query execution time is predicted based on a summation of estimated execution time of each of the one or more MR jobs in the DAG executed on the second dataset. The first cluster comprising the first dataset is smaller as compared to the second cluster comprising the second dataset. One or more sub-phases of the one or more MR jobs in the DAG comprises a read time, a map time, a collect time, a spill time, a merge time, a shuffle time, a sort time, and a write time. The read time is calculated as a function of size of input data, number of concurrent maps per node, and number of input records. The map time is calculated as a function of input records. The collect time is calculated as a function of number of concurrent maps per node and number of output records. The spill time is calculated as a function of size of map output data, number of concurrent maps per nodes, and number of output records. The merge time is calculated as function of size of map output data, number of concurrent maps per nodes, number of map tasks, and number of reduce tasks. The shuffle time is calculated as a function of size of map output data, number of concurrent maps per node, number of map tasks and number of reduce tasks. The sort time is calculated as a function of size of map output data, number of concurrent maps per node, number of map tasks and number of reduce tasks. The write time is calculated as a function of size of reduce output data and number of reduce output records.

In another embodiment, a processor implemented system is provided. The system includes a memory storing instructions; a communication interface; and one or more hardware processors coupled to the memory, wherein the one or more hardware processor are configured by the instructions to: execute one or more synthetic benchmarks on a first dataset on a first cluster comprising a first set of nodes, wherein each of the one or more synthetic benchmarks comprises a MapReduce (MR) job, the MR job comprises a map task and a reduce task, extract one or more sensitive parameters related to performance of each sub-phase in the MR job, wherein the one or more sensitive parameters comprises an input size per map task, map selectivity, number of map tasks, number of reduce tasks, record selectivity, concurrent map tasks per node, one or more map waves, and disk resource contention delay, generate a linear regression prediction model using the one or more sensitive parameters to obtain a set of linear regression prediction models, and generate a performance prediction model based on the set of linear regression prediction models generated using the first dataset.

In an embodiment, the hardware processor is further configured by the instructions to: process a Hive query such that the Hive query is translated into Directed Acyclic Graph (DAG) of one or more MR jobs, execute the DAG of the one or more MR jobs on a second dataset on a second cluster comprising a second set of nodes, extract the one or more sensitive parameters from a job execution log obtained upon executing the DAG of the one or more MR jobs, and predict, using the performance prediction model, a Hive query execution time of the DAG of the one or more MR jobs based on the one or more sensitive parameters from the job execution log obtained upon executing the DAG of the one or more MR jobs on the second dataset. The first dataset is a smaller as compared to the second dataset.

In yet another embodiment, one or more non-transitory machine readable information storage mediums comprising one or more instructions is provided. The one or more instructions which when executed by one or more hardware processors causes executing, one or more synthetic benchmarks on a first dataset on a first cluster comprising a first set of nodes, wherein each of the one or ore synthetic benchmarks comprises a MapReduce (MR) job, the MR job comprises a map task and a reduce task; extracting, one or more sensitive parameters related to performance of each sub-phase in the MR job, wherein the one or more sensitive parameters comprises at least one of an input size per map task, map selectivity, number of map tasks, number of reduce tasks, record selectivity, concurrent map tasks per node, one or more map waves, and disk resource contention delay; generating, a linear regression prediction model using the one or more sensitive parameters to obtain a set of linear regression prediction models; and generating, via the one or more hardware processors, a performance prediction model based on the set of linear regression prediction models generated using the first dataset.

In an embodiment, the one or more instructions which when executed by one or more hardware processors further causes processing, a Hive query such that the Hive query is translated into Directed Acyclic Graph (DAG) of one or more MR jobs; executing, the one or more MR jobs on a second dataset on a second cluster comprising a second set of nodes; extracting, via the one or more hardware processors, the one or more sensitive parameters from a job execution log obtained upon executing the DAG of the one or more MR jobs; and predicting, using the performance prediction model, a Hive query execution time of the DAG of the one or more MR jobs based on the one or more sensitive parameters from logs obtained for one or more sub-phases of the one or more MR jobs executed on the second dataset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a table view that illustrates Map Reduce (MR) phases and associated sensitive parameters for performance prediction model according to an embodiment of the present disclosure.

DETAILED DESCRIPTION

Figure 1:
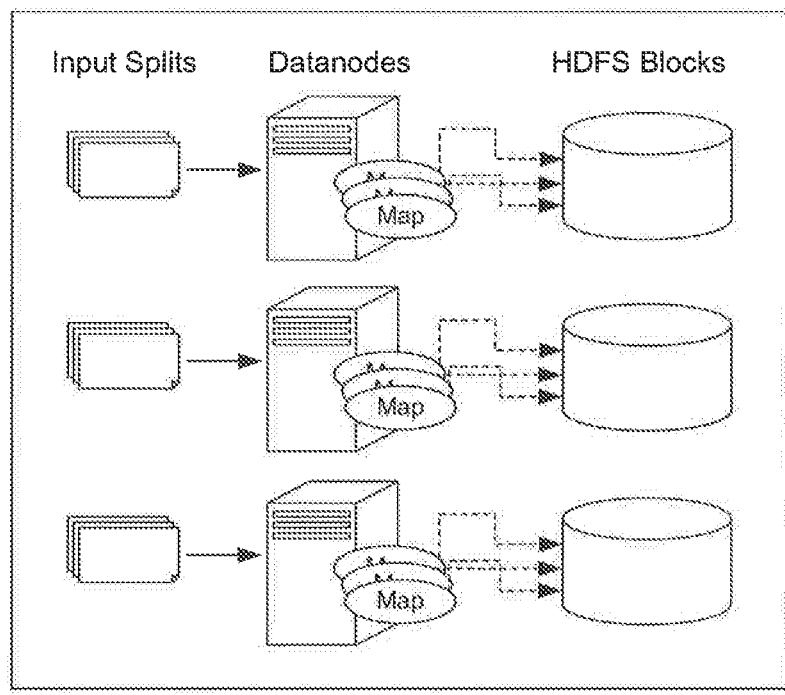
FIG. 1 is a block diagram of a convention system that depicts concurrent map tasks causing bottlenecks at I/O.
Figure 2:
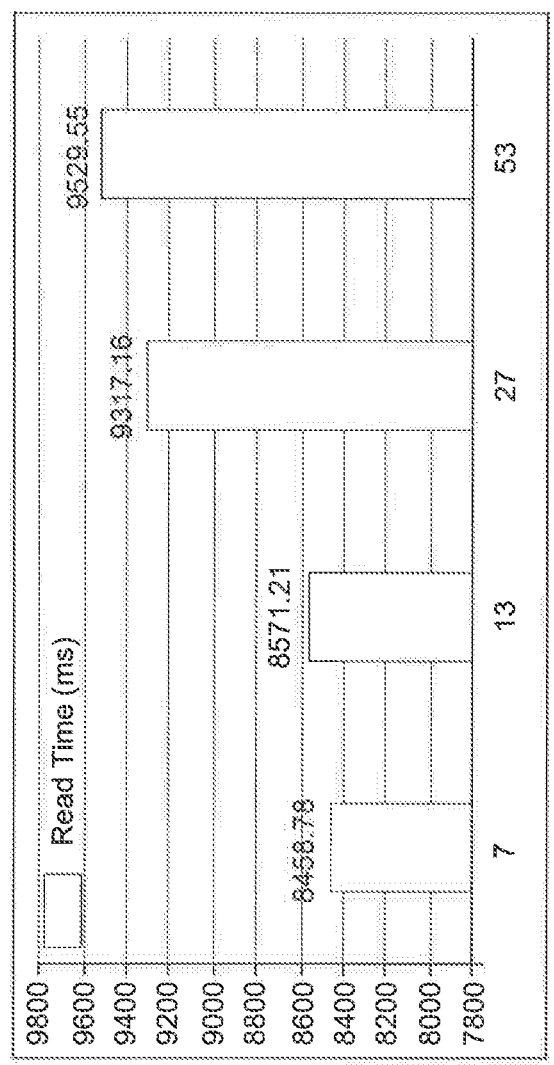
FIG. 2 is a graphical representation that illustrates impact of increasing the concurrent map tasks per node on the processing time of read phase.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Referring now to the drawings, and more particularly to FIG. 3A through 8, where similar reference characters denote corresponding features consistently throughout the figures, there are shown preferred embodiments and these embodiments are described in the context of the following exemplary system and/or method.

Figure 3A:
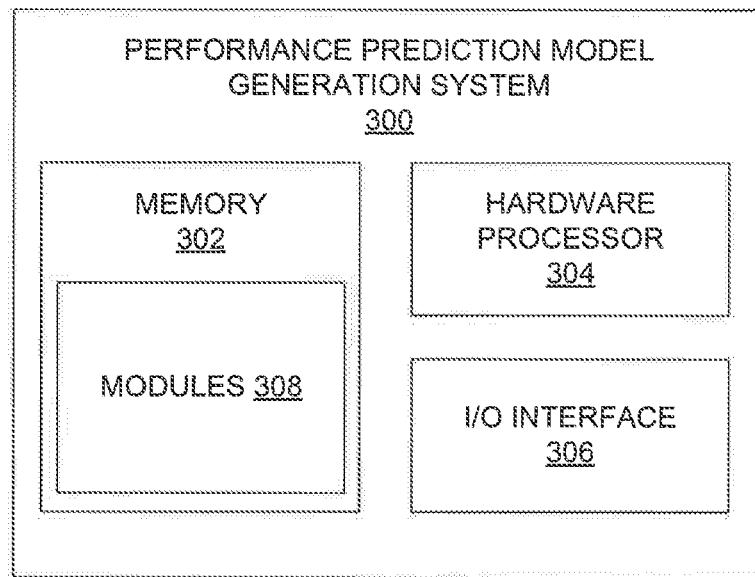
FIG. 3A is a block diagram of a performance prediction model generation system according to an embodiment of the present disclosure.

FIG. 3A is a block diagram of a performance prediction model generation system 300 according to an embodiment of the present disclosure. The term "performance prediction model (PPM) generation system" and "system" may be interchangeably used herein. The PPM generation system 300 comprises a memory 302, a hardware processor 304, and an input/output (I/O) interface 306. The memory 302 further includes one or more modules 308 (or modules 308). The memory 302, the hardware processor 304, the input/output (I/O) interface 306, and/or the modules 308 may be coupled by a system bus or a similar mechanism.

The memory 302, may store instructions, any number of pieces of information, and data, used by a computer system, for example the PPM generation system 300 to implement the functions (or embodiments) of the present disclosure.

The memory 302 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 302 may be configured to store information, data, applications, instructions or the like for enabling the PPM generation system 300 to carry out various functions in accordance with various example embodiments.

Additionally or alternatively, the memory 302 may be configured to store instructions which when executed by the hardware processor 304 causes the PPM generation system 300 to behave in a manner as described in various embodiments (e.g., extracting one or more sensitive parameters, generating a performance prediction model specific to a first dataset and using the performance prediction model to predict a Hive query execution time of one or more MapReduce jobs in a Directed Acyclic Graph executed on a second dataset). The memory 302 stores information for example, information related to one or more applications, one or more sensitive parameters, and performance and execution time of the one or more applications, and the like.

The hardware processor 304 may be implemented as one or more microprocessors, microcomputers, microcontrollers, digital signal processors, central processing units, state machines, logic circuitries, and/or any devices that manipulate signals based on operational instructions. Further, the hardware processor 304 may comprise a multi-core architecture. Among other capabilities, the hardware processor 304 is configured to fetch and execute computer-readable instructions or modules stored in the memory 302. The hardware processor 304 may include circuitry implementing, among others, audio and logic functions associated with the communication. For example, the hardware processor 304 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 304 thus may also include the functionality to encode messages and/or data or information. The hardware processor 304 may include, among other things, a clock, an arithmetic logic unit (ALU) and logic gates configured to support operation of the hardware processor 304. Further, the hardware processor 304 may include functionality to execute one or more software programs, which may be stored in the memory 302 or otherwise accessible to the hardware processor 304.

The hardware processor 304 is configured by the instructions stored in the memory 302. The hardware processor 304 when configured by the instructions to execute one or more synthetic benchmarks on a first dataset on a first cluster that includes a first set of nodes. Each of the one or more synthetic benchmarks (also referred herein as MapReduce benchmarks) includes a MapReduce (MR) job. Each of the MR job includes a map task and a reduce task. In an example embodiment, MapReduce benchmarks may be executed on smaller datasets ranging from 80 MB 2 GB on a smaller 3 node cluster. The MapReduce benchmarks may be executed with different values of split sizes, for example, 4 MB, 8 MB, 16 MB, 32 MB, 64 MB, and the like. The hardware processor 404 may further be configured to change number of map tasks to 20, 40, 80 and 160 in each. The hardware processor 304 is further configured by the instructions to extract one or more sensitive parameters related to performance of each sub-phase in the MR job. The one or more sensitive parameters comprises, but are not limited to, an input size per map task, map selectivity, number of map tasks, number of reduce tasks, record selectivity, concurrent map tasks per node, one or more map waves, disk resource contention delay, and combinations thereof. Specifically, extracting the sensitive parameters such as for example, record selectivity, enables one or more users to change output record size and number of output records. The record selectivity parameter is used to create output records of different numbers and sizes as specified by the one or more users. In an example embodiment, record selectivity is based on Map output Record size and Map Input Record size (these are obtained from job execution log—from MR job log of one time execution of application). More specifically, record selectivity is a ratio of Map output Record size and Map Input Record size. Similarly, concurrent map tasks per node is based on Number of map and reduce slots from configuration file. More specifically, concurrent map tasks per node is a ratio of Number of map and reduce slots from configuration file. Map waves is based on input data size and split size (or data size per map slot). More specifically, map waves is ratio of input data size and split size (or data size per map slot). Disk resource contention delay can be obtained using DD executed by multiple threads on one machine. In an example embodiment, DD is a system command (for example, in a linux operating system) to get disk speed. In one example embodiment, the one or more sensitive parameters are related to performance such as execution time for each sub-phase of MapReduce application.

The hardware processor 304 is further be configured to profile (e.g., using Starfish profiler) and extract counters that measure duration of one or more phases, input data size, number of input records, output data size and output record size in each phase. Starfish profiler make use of BTrace—a dynamic instrumentation tool for Java. BTrace intercepts class byte codes at runtime based on event-condition-action rules and injects byte codes for the associated actions. The hardware processor 304 is further configured by the instructions to generate a linear regression prediction model using the one or more sensitive parameters to obtain a set of linear regression prediction models. In one embodiment, the hardware processor 304 implements 'R' tool that takes the one or more sensitive parameters as input and gives the parameters of the linear regression prediction models as shown in FIG. 4. The hardware processor 304 is further configured by the instructions to generate a performance prediction model based on the set of linear regression prediction models generated using the first dataset.

The hardware processor 304 is further configured by the instructions to process a Hive query such that the Hive query is translated into Directed Acyclic Graph (DAG) of one or more MR jobs. The hardware processor 304 further executes the DAG of the one or more MR jobs on a second dataset on a second cluster that includes a second set of nodes. Upon execution of the DAG of the one or more MR jobs. The hardware processor 304 extracts the one or more sensitive parameters from a job execution log. This job execution log is generated when the DAG of the one or more MR jobs are executed. The hardware processor 304 then uses the performance prediction model to predict a Hive query execution time of the DAG of the one or more MR jobs based on (or using) the one or more sensitive parameters from the job execution log from upon executing the DAG of the one or more MR jobs on the second dataset. The first dataset is smaller as compared to the second dataset, in one example embodiment.

Figure 3B:
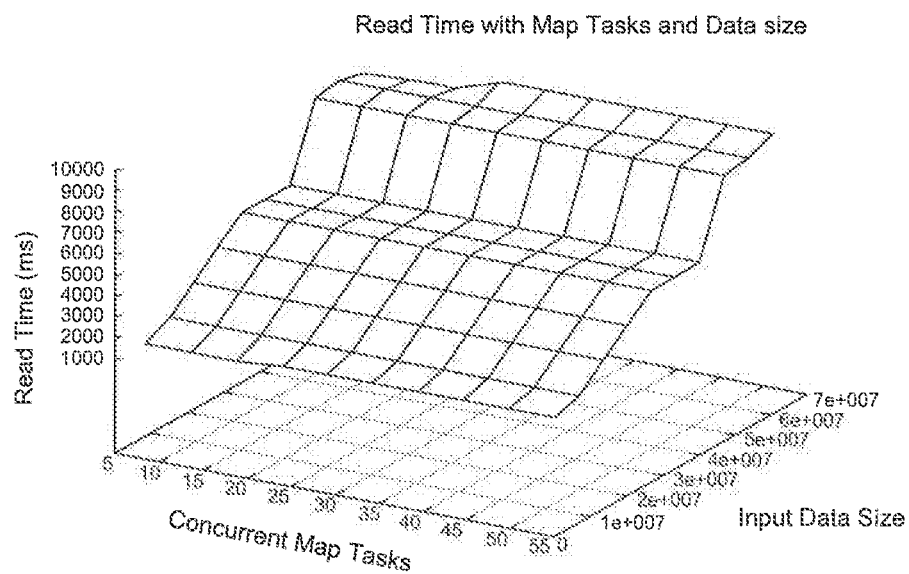
FIG. 3B is a graphical representation that illustrates read time with concurrent maps and data size according to an embodiment of the present disclosure.

As mentioned above, the performance prediction model generation system 300 extracts the one or more sensitive parameters. More specifically, sensitive parameter such as, record selectivity plays an important role when the performance prediction model needs to applied to one or more applications that have high diversity in input data. Record selectivity is defined as the size of input record for the same data size. It controls the number of input records for the same input size to map task. CPU bound MapReduce phases such as Map processing, collect phases are dependent on the number of records rather than the total data size. The embodiments of the present disclosure, enables the performance prediction model generation system 300 to extract and account record selectivity as a major parameter along with number of concurrent map tasks. FIG. 3B, with reference to FIG. 3A, is a graphical representation that illustrates read time with concurrent map tasks and input data size according to an embodiment of the present disclosure.

The embodiments of the present disclosure enables the performance prediction model generation system 300 to estimate each MR phase execution time for larger data size based on a linear equation as expressed below:

$$\text{Execution Time} = A \times \text{param1} + B \times \text{param2} + \ldots + C \qquad (1)$$

Param1, param 2 are the number of sensitive parameters extracted, and A, B, and C correspond to at least one of Size of Input Data (Map/Reduce), Size of Output Data, (Map/Reduce), Map Tasks, Number of Input Records (Map/Reduce), Number of Output Records (Map/Reduce), and Reduce Tasks represented by tick marks in the table depicted in FIG. 4. FIG. 4, with reference to FIGS. 3A-3B, is a table view that illustrates MapReduce (MR) phases and associated sensitive parameters for performance prediction model according to an embodiment of the present disclosure. More specifically, the table of FIG. 4 summarizes for each sub phase of MR job the sensitive parameters which impacts the execution time of the sub phase. These are used for building the linear regression prediction model for each phase. These parameters are shortlisted based on the empirical study of the various experiments and also the statistical tool 'R' shows 99% correlation coefficients for their respective linear regression models. Read phase reads and prepares data for processing which is disk bound activity. Hence, its execution time depends on the size of data to be read, number of maps tasks reading from the same disk at a node and the number of input records. Collect phase collects map output records after processed by a map function. It does record level processing and CPU intensive. Its execution time depends on number of map output records and number of map tasks scheduled at each node. Spill phase writes map output records to disk if it does not fit in the map task memory. It is both CPU and disk intensive. Its execution time depends on the size of a map task output data, number of map tasks per node and number of map task output records. Merge phase sorts and merges the data outputted by a map task. Therefore, it is both CPU and disk intensive. Further, execution time depends on the size of map output data, number of map tasks per node and number of map output records.

In shuffle phase, each reduce task gets map tasks output data from each of the nodes in the cluster. Its execution time is in proportion to total map tasks output data it fetches, which depends on total number of nodes in the cluster and number of reduce tasks. The fetching of data from a node depends on the number of map tasks scheduled on that node. Sort phase merges all map output records received by a reduce task. Its execution time depends on the size input data to the reduce task which is calculated using size of map output data and number of reduce tasks. Write phase writes the reduce output records to Hadoop Distributed File System (HDFS). Its execution time depends on the size of reduce output data and number of reduce output records. Map and reduce function times are calculated as a function of their respective input records and time per record processing is obtained from the application profiling on small data size.

More specifically, different sub-phases of the one or more MR jobs as depicted in FIG. 4, are defined as below:

Read time is calculated as a function of size of input data, number of concurrent maps per node, and number of input records. Similarly, Map time is calculated as a function of input records, Collect time is calculated as a function of number of concurrent maps per node, and number of output records, Spill time is calculated as a function of size of map output data, number of concurrent maps per node, and number of output records. Further, Merge time is calculated as a function of size of map output data, number of concurrent maps per node, and number of output records, Shuffle time is calculated as a function of size of map output data, number of concurrent maps per node, number of map tasks and number of reduce tasks, Sort time is calculated as a function of size of map output data, number of concurrent maps per node, number of map tasks and number of reduce tasks, and Write time is calculated as a function of size of reduce output data and number of reduce output records.

The Hive query DAG execution plan is mapped to serial execution of the corresponding MR jobs. It has been empirically observed that a Hive query execution time is same as the execution time of the MR jobs in its execution plan. A Hive query execution plan for a larger data size can be obtained from its optimizer before actually running the query. Hive cost based optimizer (080) stores the metadata about the application data which is used to build a DAG execution plan for the application's Hive query. This metadata can be linearly extrapolated for the larger data size without actually generating the large data sets. Hive optimizer shall generate DAG execution plan for a Hive query on the larger data size. Hive optimizer with the extrapolated metadata will output DAG for the SQL\query on larger dataset, where each node in the DAG has MR job with its estimated input and output data sizes. Assuming a Hive query execution plan remains same with increase in data size, the Hive query execution time on a larger data size can be predicted as summation of estimated execution time of each of its MR job on the larger data size. In other words, the Hive query execution time is predicted based on a summation of estimated execution time of each of the one or more MR jobs in the DAG executed on the second dataset on second set of cluster nodes, and is expressed in accordance with the following equation:

$$f(\text{HiveQL Execution Time}) = \Sigma_{\text{for all MR jobs}}(\text{MR jobs in DAG}) \quad (2)$$

Alternatively, the PPM generation system 300 may execute the modules 308 comprising an execution module that when executed by the hardware processor 304 executes one or more synthetic benchmarks on the first dataset on the first cluster comprising the first set of nodes. The modules 308 may further include an extraction module that when executed by the hardware processor 304 extracts one or more sensitive parameters related to performance of each sub-phase in the MR job, wherein the one or more sensitive parameters comprises an input size per map task, map selectivity, number of map tasks, number of reduce tasks, record selectivity, concurrent map tasks per node, one or more map waves, and disk resource contention delay. The modules 308 may further include model generation nodule that generates a linear regression prediction model using the one or more sensitive parameters to obtain a set of linear regression prediction models, and further generates a performance prediction model based on the set of linear regression prediction models generated using the first dataset. The modules 308 may further include a prediction module that processes a Hive query such that the Hive query is translated into Directed Acyclic Graph (DAG) of one or more MR jobs, and predicts a Hive query execution time of the DAG of the one or more MR jobs based on one or more sensitive parameters extracted from the job execution log obtained upon executing the DAG of the one or more MR jobs on the second dataset. The modules for example, the execution module, the extraction module, the model generation module, and the prediction module are implemented as at least one of a logically self-contained part of a software program, a self-contained hardware component, and/or, a self-contained hardware component, with a logically self-contained part of a software program embedded into each of the hardware component that when executed perform the above method described herein, in one embodiment.

Figure 5:
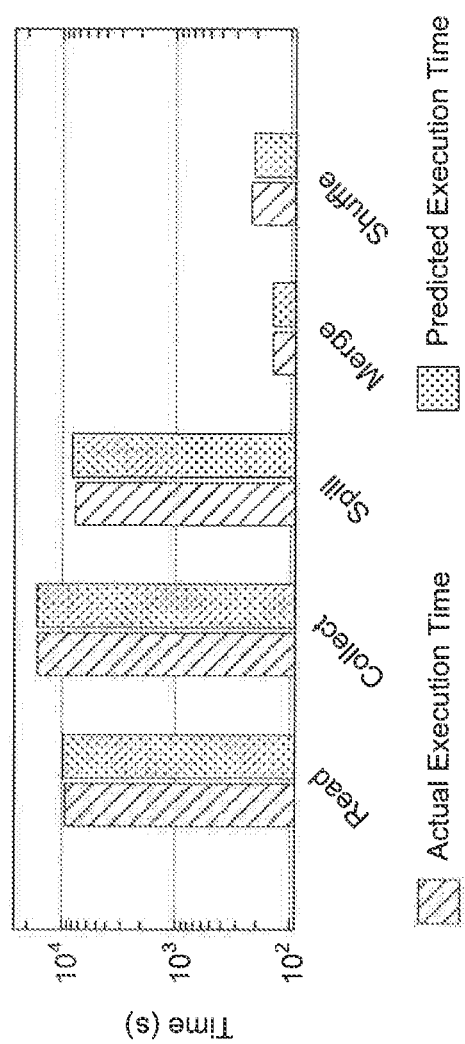
FIG. 5 is a graphical representation of predicted and measured execution times for sub-phases in a Directed Acyclic Graph (DAG) of one or more MR jobs according to an embodiment of the present disclosure.
Figure 6A:
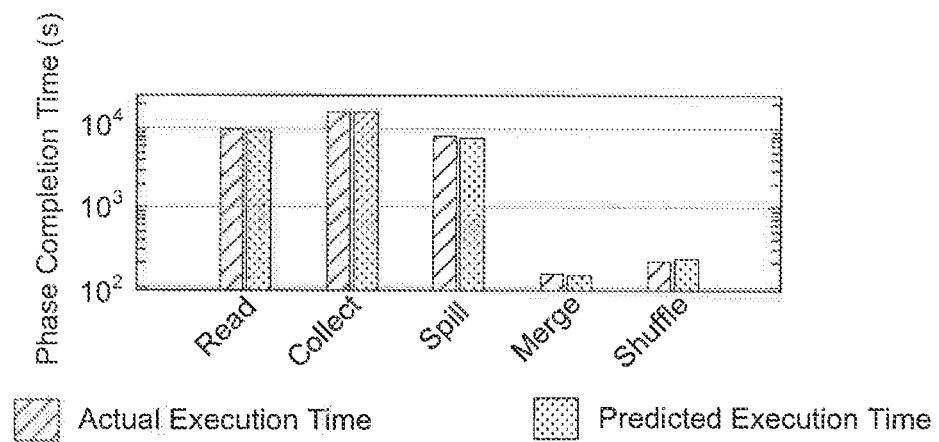
FIG. 6A is graphical representation that illustrates predicted versus measured completion times for an application according to an embodiment of the present disclosure.
Figure 6B:
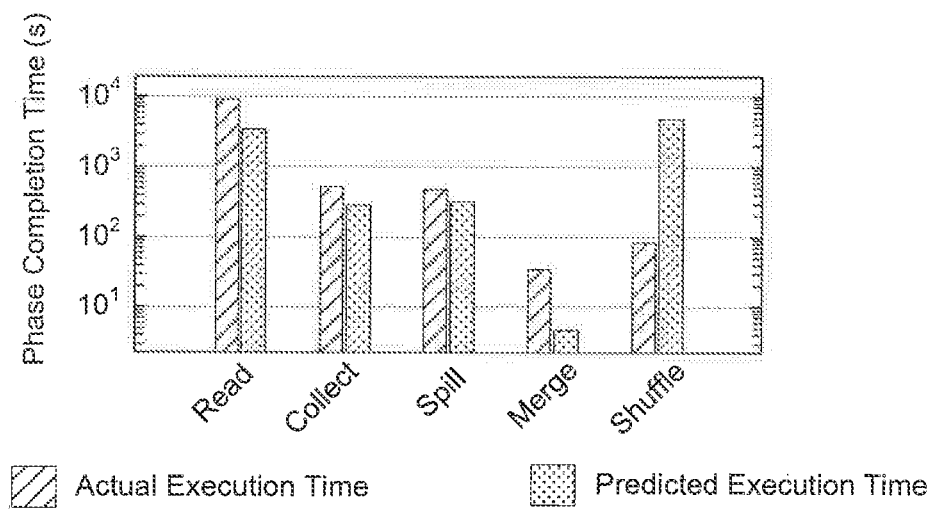
FIG. 6B is graphical representation that illustrates predicted versus measured completion times for another application according to an embodiment of the present disclosure.

FIG. 5, with reference to FIGS. 3A through 4, is a graphical representation of predicted and measured execution times for sub-phases in a Directed Acyclic Graph (DAG) of the one or more MR jobs of an application according to an embodiment of the present disclosure. Based on the experimental results (shown below), the MR job execution time prediction model has been validated for an application, for example, a WordCount application having 100 bytes as input record size (as shown in FIG. 6A). The model is tested to predict the execution time of the WordCount application on 24 cores and 56 cores cluster. More specifically, FIG. 6A shows the predicted and actual execution times for various sub-phases of application. Bar with dots represent the predicted value of execution time whereas other bar is the actual value of execution time. It is observed that there is very minimal difference between the predicted value and measured value for WordCount application. It can be clearly observed that, in contrast to WordCount application, there is significant degrade in the prediction accuracy for FINRAI application (as shown in FIG. 6B). This is due to the fact that record size differs significantly for both these application. While WordCount application uses small record size of 8 bytes, FINRA application on the other hand, consists of 100 bytes records. This shows that record selectivity plays a significant role in building the prediction model. However, this parameter was ignored in state of the art approaches.

Figure 7A:
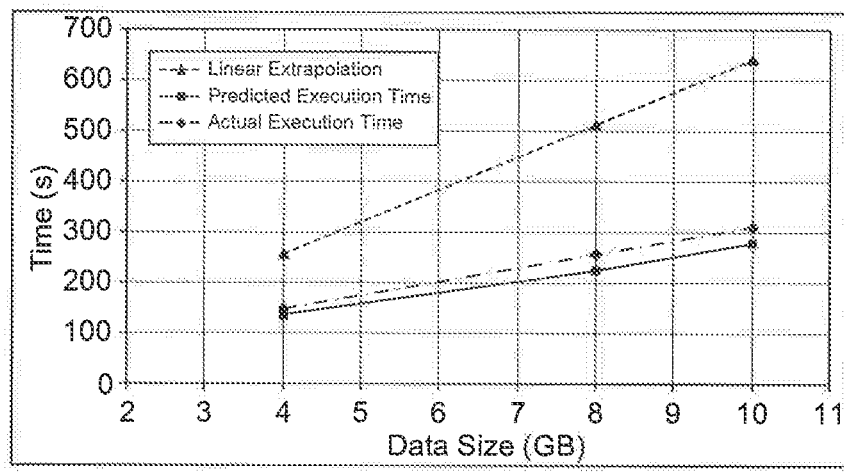
FIG. 7A is a graphical representation that illustrates execution time on different data sizes for a Hive Query according to an embodiment of the present disclosure.
Figure 7B:
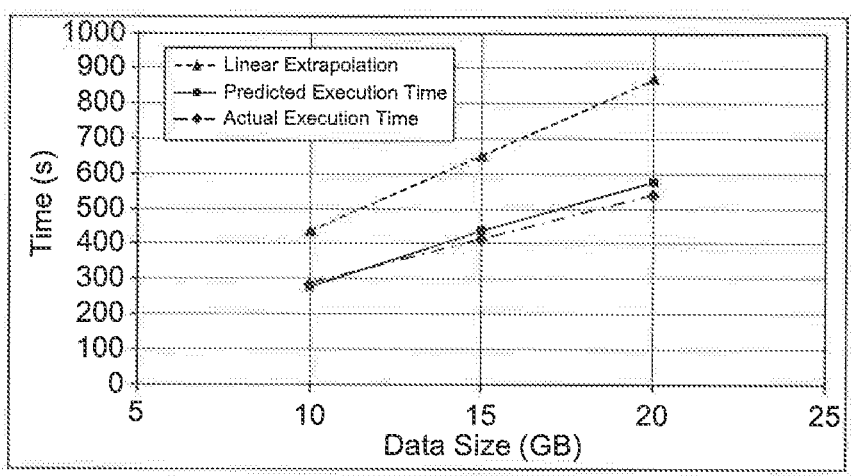
FIG. 7B is a graphical representation that illustrates execution time on different data sizes for another Hive Query according to an embodiment of the present disclosure.

FIG. 7A, with reference to FIGS. 3A through 6B, is a graphical representation that illustrates execution time on different data sizes for a Hive Query according to an embodiment of the present disclosure. FIG. 7B is a graphical representation that illustrates execution time on different data sizes for another Hive Query according to an embodiment of the present disclosure. The embodiments of the present disclosure describe how the response time of Hive queries are predicted. The Hive queries selected for experimental evaluation are described in below table:

| Sl. No | Query |
|---|---|
| 1 | SELECT sum(Routed_Shares_Quantity), sum(Route_Price) FROM default.rt_query_extract GROUP BY Route_Price |
| 2 | SELECT l.l_partkey, sum(l.l_extendedprice*(1-l.l_discount)) as revenue FROM lineitem l JOIN part p ON p.p_partkey = l.l_partkey GROUP BY l.l_partkey |

The first and second HiveQI as depicted above in relation to FIGS. 7A-7B are from real world financial application and TPCH benchmarks respectively. The datasets of financial applications are in a flat file of a number of records each of size 123 bytes. TPC-H is an ad-hoc, decision support benchmark with an available dataset. It consists of a suite of business oriented ad-hoc queries. The datasets has two flat files—'part' and 'lineitem' having records, each of size 117 bytes and 125 bytes respectively. The first query launches a single MR job as this works on single table whereas second query launches two MR jobs in a sequential manner. More specifically, FIGS. 7A-7B, show the execution time of HiveQI 1 and HiveQI 2 respectively on different data sizes (4-20 GB) as predicted by the performance prediction model. The map and record selectivity of each MR job of a Hive query are calculated from the training model of Hive query execution on small data sizes. The dash-dotted lines with diamond shape points in FIGS. 7A-7B represents the actual execution time whereas solid curve like straight line represents the predicted execution time. It can be seen that the predicted execution time is close to the actual execution time. The dash lines represents the linear extrapolation with respect to data size. Interestingly, linear extrapolation model with respect to data size provides an incorrect estimation (as shown in FIGS. 7A-7B). Whereas, if the proposed approach of execution time prediction is used, the error rate in execution time prediction is very low (less than 13%). Query 2 from the above table launches two MapReduce jobs in sequence. However, for an optimally configured MR framework, total execution time of two concurrent MR jobs is same as sum of their individual execution times, therefore HiveQL execution time is predicted as summation of execution time of each of its launched MR job.

Therefore, the prediction modeling approach proposed in the present disclosure proves to be better approach when considering important parameters such as number of map tasks and record selectivity in the model for predicting execution time of different phases of MR job. This was shown using the experimental results with map reduce implementation of Word Count Application for increasing data sizes. The model is built using linear regression, so implicitly it assumes uniform growth in the data distribution, so that each phase of MR job execution has proportionate increase in input data size with data growth. Moreover, MR framework hashing function to schedule key value pairs per reduce task assume to distribute data uniformly across all reduce tasks which may not be true for skewed data distribution. One may need to model data growth pattern in the model for correct calculation of input data size to each sub phase.

The MR prediction model is used to predict execution time of Hive SQL queries. Based on the above experimental results, the model is validated for analytic workload of financial application and TPC-H benchmark. Results demonstrate that the proposed model could predict a SQL query execution time within 10. This estimation can be useful for big data service providers for better allocation of resources, better scheduling policies and also estimating the energy demand of datacenters.

Figure 8:
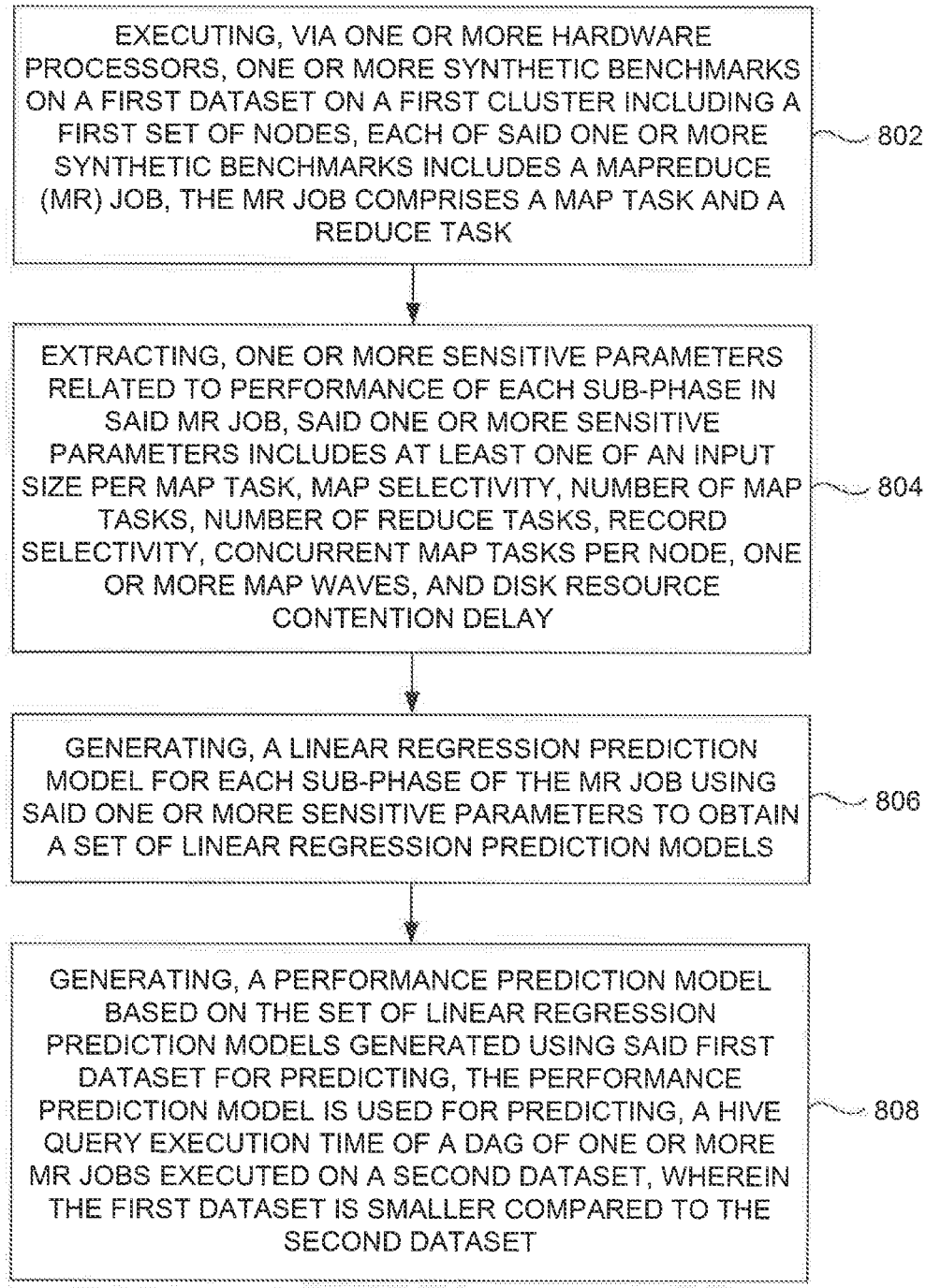
FIG. 8 is a flow diagram illustrating a processor implemented method for generation of performance prediction model that is used for prediction of Hive query execution time of the DAG of the one or more MR jobs according to an embodiment of the present disclosure.

FIG. 8, with reference to FIGS. 3A through 7B, is a flow diagram illustrating a processor implemented method for generation of performance prediction model that is used for prediction of Hive query execution time of the DAG of the one or more MR jobs according to an embodiment of the present disclosure. In step 802, one or more synthetic benchmarks are executed (using the hardware processor 304) on a first dataset on a first cluster comprising a first set of nodes. Each of the one or more synthetic benchmarks comprises a MapReduce (MR) job, wherein the MR job comprises a map task and a reduce task. In step 804, one or more sensitive parameters related to performance of each sub-phase in the MR job are extracted. The one or more sensitive parameters comprises at least one of an input size per map task, map selectivity, number of map tasks, number of reduce tasks, record selectivity, concurrent map tasks per node, one or more map waves, and disk resource contention delay. In step 806, a linear regression prediction model is generated using the one or more sensitive parameters to obtain a set of linear regression prediction models. In step 808, a performance prediction model is generated based on the set of linear regression prediction models generated using the first dataset. The method may further include processing a Hive query such that said Hive query is translated into Directed Acyclic Graph (DAG) of one or more MR jobs, executing, the DAG of the one or more MR jobs on a second dataset on a second cluster comprising a second set of nodes; extracting the one or more sensitive parameters from a job execution log obtained upon executing the DAG of the one or more MR jobs; and predicting, using the performance prediction model, a Hive query execution time of the DAG of the one or more MR jobs based on the one or more sensitive parameters from logs obtained for one or more sub-phases of the one or more MR jobs executed on the second dataset. The Hive query execution time is predicted based on a summation of estimated execution time of each of the one or more MR jobs in the DAG executed on the second dataset. The first dataset is smaller as compared to the second dataset and first set of nodes in the first cluster may be less than that of the second set of nodes in the second cluster, in one example embodiment.

Performance Prediction Model evaluation

The hardware configuration used in the experiments is described in below table:

| Cluster | CPU | Memory | Storage | Operating System |
|---|---|---|---|---|
| Eka | 8 CPU x86_64 Architecture | 16 GB | 35 GB | Red Hat 4.4.6-3 |

Each node consists of 8 cores CPU x86_64 architecture with 16 GB memory and 35 GB storage hosting Red Hat 4.4.6-3. The MapReduce framework is Apache Hadoop v1.2.1 on Java 7. Most of the Hadoop configuration parameters have default values except stated otherwise as shown in below Table.

| Parameter | Value |
|---|---|
| Input Split Size | 64 MB |
| Concurrent Map Tasks Per Node | 8 |
| Concurrent Reduce Tasks Per Node | 1 |
| Replication Factor | 2 |
| mapreduce.task.io.sort.mb | 100 |

Each task tracker is configured to run 8 concurrent tasks; since there are 8 core CPUs on each node of cluster. Reduce task is configured to start after completion of Map task. The input split size is set to 64 MB and replication factor is set to 2. The experiments for budding training model and validation of the model are run after flushing MR framework and OS level caches so that results are unbiased to the previous executions. This ensures that in each experiment, data is fetched from the underlying storage subsystem at each node in the cluster. The accuracy of the prediction model is also validated on larger cluster size as mentioned in FIG. 6A which is shown in table below:

| Cluster Size | Prediction error |
|---|---|
| 24 Cores | 9.81 |
| 56 Cores | 9.99 |

From the above validation, it is observed that the maximum error rate is said to be less than 10%. As described above, MR framework profile is first created on a three node cluster on small data set ranging from 80 MB to 2 GB by executing synthetic benchmarks on different data sizes with input record size of 100 bytes. Then, analytical models are built using R on the generated profiles, thereby applying the performance prediction model to predict the job execution time for each MR job. Using equation 2, the Hive query execution time is predicted. Although the profiles are created on a very small dataset, based on the experimental results, the embodiments of the present disclosure enable the PPM generation system 300 to predict the execution time for MapReduce applications processing very large dataset (11 GB to 23 GB) with maximum error as 10%. This shows that the model correctly predicts the execution time of MapReduce application on increasing data volumes which is evident from FIGS. 6A-6B.

The embodiments of the present disclosure enable the PPM generation system 300 to guarantee a desired level of performance over time by assuring performance of its Hive queries for larger data size for a Hive-Hadoop based analytical application. This is achieved by predicting execution time of application Hive queries for larger data size before deployment and take corrective actions if it deviates the desired performance. A Hive query is executed as series of map-reduce (MR) jobs, therefore a Hive query execution time on larger data size can be estimated by predicting a MR job execution time on the larger data size. A MR job execution time could be predicted for larger data size using multiple linear regression models for each of its sub phase during execution. However, it is important to identify the performance sensitive parameters for building the models for different sub phases of MR job. Unlike the conventional systems and methods which fails to account (or determine) sensitive parameters, for example record selectivity, concurrent map tasks per node, one or more map waves, and disk resource contention delay for various phases (or subphases), the PPM generation system 300 extracts these sensitive parameters for each phase/sub phase of MR job that results in prediction of execution time of MR jobs. The PPM generation system 300 extracts these sensitive parameters (e.g., input data size, map selectivity, record selectivity and total number of maps and reduces because sub-phases doing record level processing, such as collect's execution time depends not only on the input data size but also on size of each record. Although, the embodiments of the present disclosure are implemented for short running MR jobs and Hive queries, it is to be understood for a person having ordinary skill in the art to validate the model for different real life applications having long running jobs.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or mare processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
executing, via one or more hardware processors, one or more synthetic benchmarks on a first dataset on a first cluster comprising a first set of nodes, wherein each of said one or more synthetic benchmarks comprises a MapReduce (MR) job, said MR job comprises a map task and a reduce task;

extracting, via said one or more hardware processors, one or more sensitive parameters related to performance of each sub-phase in said MR job, wherein said sensitive parameters are extracted based on a job execution log obtained upon executing of said MR job, and wherein said one or more sensitive parameters comprises at least one of an input size per map task, map selectivity, number of map tasks, number of reduce tasks, record selectivity, concurrent map tasks per node, one or more map waves, and disk resource contention delay;

generating, via said one or more hardware processors, a linear regression prediction model using said one or more sensitive parameters to obtain a set of linear regression prediction models; and generating, via said one or more hardware processors, a performance prediction model based on said set of linear regression prediction models generated using said first dataset; wherein the linear regression prediction model indicates uniform growth in the data distribution, such that each phase of said MR job execution has proportionate increase in input data size with data growth;

processing, via said one or more hardware processors, a Hive query such that said Hive query is translated into Directed Acyclic Graph (DAG) of said MR job;

executing, via said one or more hardware processors, said MR job on a second dataset on a second cluster comprising a second set of nodes;

extracting, via said one or more hardware processors, said one or more sensitive parameters from a job execution log obtained upon executing said DAG of said MR job, wherein the sensitive parameters are related to performance of the sub-phases of said MR job; and predicting, using said performance prediction model, a Hive query execution time of said DAG of said MR job based on the sensitive parameters from execution log obtained for the one or more sub-phases of said MR job executed on said second dataset.

2. The processor-implemented method of claim 1, wherein said Hive query execution time is predicted based on a summation of estimated execution time of each of said one or more MR jobs in said DAG executed on said second dataset.

3. The processor-implemented method of claim 1, wherein said first cluster comprising said first dataset is smaller as compared to said second cluster comprising said second dataset.

4. The processor-implemented method of claim 1, wherein one or more sub-phases of said one or more MR jobs in said DAG comprises a read time, a map time, a collect time, a spill time, a merge time, a shuffle time, a sort time, and a write time.

5. The processor-implemented method of claim 4, wherein said read time is calculated as a function of size of input data, number of concurrent maps per node, and number of input records.

6. The processor-implemented method of claim 4, wherein said map time is calculated as a function of input records.

7. The processor-implemented method of claim 4, wherein said collect time is calculated as a function of number of concurrent maps per node and number of output records.

8. The processor-implemented method of claim 4, wherein said spill time is calculated as a function of size of map output data, number of concurrent maps per nodes, and number of output records.

9. The processor-implemented method of claim 4, wherein said merge time is calculated as function of size of map output data, number of concurrent maps per nodes, number of map tasks, and number of reduce tasks.

10. The processor-implemented method of claim 4, wherein said shuffle time is calculated as a function of size of map output data, number of concurrent maps per node, number of map tasks and number of reduce tasks.

11. The processor-implemented method of claim 4, wherein said sort time is calculated as a function of size of map output data, number of concurrent maps per node, number of map tasks and number of reduce tasks.

12. The processor-implemented method of claim 4, wherein said write time is calculated as a function of size of reduce output data and number of reduce output records.

13. A processor implemented system comprising:
a memory storing instructions;
a communication interface; and
one or more hardware processors coupled to said memory, wherein said one or more hardware processor (304) are configured by said instructions to:
execute one or more synthetic benchmarks on a first dataset on a first cluster comprising a first set of nodes, wherein each of said one or more synthetic benchmarks comprises a MapReduce (MR) job, said MR job comprises a map task and a reduce task;
extract one or more sensitive parameters related to performance of each sub-phase in said MR job, wherein said sensitive parameters are extracted based on a job execution log obtained upon executing of said MR job, and wherein said one or more sensitive parameters comprises an input size per map task, map selectivity, number of map tasks, number of reduce tasks, record selectivity, concurrent map tasks per node, one or more map waves, and disk resource contention delay;
generate a linear regression prediction model using said one or more sensitive parameters to obtain a set of linear regression prediction models, and
generate a performance prediction model based on said set of linear regression prediction models generated using said first dataset; wherein the linear regression prediction model indicates uniform growth in the data distribution, such that each phase of said MR job execution has proportionate increase in input data size with data growth;
processing a Hive query such that said Hive query is translated into Directed Acyclic Graph (DAG) of said MR job;
executing said MR job on a second dataset on a second cluster comprising a second set of nodes;
extracting said one or more sensitive parameters from a job execution log obtained upon executing said DAG of said MR job, wherein the sensitive parameters are related to performance of the sub-phases of said MR job; and
predicting, using said performance prediction model, a Hive query execution time of said DAG of said MR job based on the sensitive parameters from execution log obtained for the one or more sub-phases of said MR job executed on said second dataset.

14. The processor-implemented system of claim 13, wherein said Hive query execution time is predicted based on a summation of estimated execution time of each of said one or more MR jobs in said DAG executed on said second dataset.

15. The processor-implemented system of claim 13, wherein said first cluster comprising said first dataset is smaller as compared to said second cluster comprising said second dataset.

16. One or more non-transitory machine readable information storage media storing instructions which, when executed by one or more hardware processors, causes the one or more hardware processors to perform a method comprising:
  executing, via said one or more hardware processors, one or more synthetic benchmarks on a first dataset on a first cluster comprising a first set of nodes, wherein each of said one or more synthetic benchmarks comprises a MapReduce (MR) job, said MR job comprises a map task and a reduce task;
  extracting, via said one or more hardware processors, one or more sensitive parameters related to performance of each sub-phase in said MR job, wherein said sensitive parameters are extracted based on a job execution log obtained upon executing of said MR job b, and wherein said one or more sensitive parameters comprises at least one of an input size per map task, map selectivity, number of map tasks, number of reduce tasks, record selectivity, concurrent map tasks per node, one or more map waves, and disk resource contention delay;
  generating, via said one or more hardware processors, a linear regression prediction model using said one or more sensitive parameters to obtain a set of linear regression prediction models; and
  generating, via said one or more hardware processors, a performance prediction model based on said set of linear regression prediction models generated using said first dataset; wherein the linear regression prediction model indicates uniform growth in the data distribution, such that each phase of said MR job execution has proportionate increase in input data size with data growth;
  processing, via said one or more hardware processors, a Hive query such that said Hive query is translated into Directed Acyclic Graph (DAG) of said MR job;
  executing, via said one or more hardware processors, said MR job on a second dataset on a second cluster comprising a second set of nodes;
  extracting, via said one or more hardware processors, said one or more sensitive parameters from a job execution log obtained upon executing said DAG of said MR job, wherein the sensitive parameters are related to performance of the sub-phases of said MR job; and
  predicting, using said performance prediction model, a Hive query execution time of said DAG of said MR job based on the sensitive parameters from execution log obtained for the one or more sub-phases of said MR job executed on said second dataset.

17. The one or more non-transitory machine readable information storage media of claim 16, wherein said first cluster comprising said first dataset is smaller as compared to said second cluster comprising said second dataset.

* * * * *